United States Patent Office 3,513,789
Patented May 26, 1970

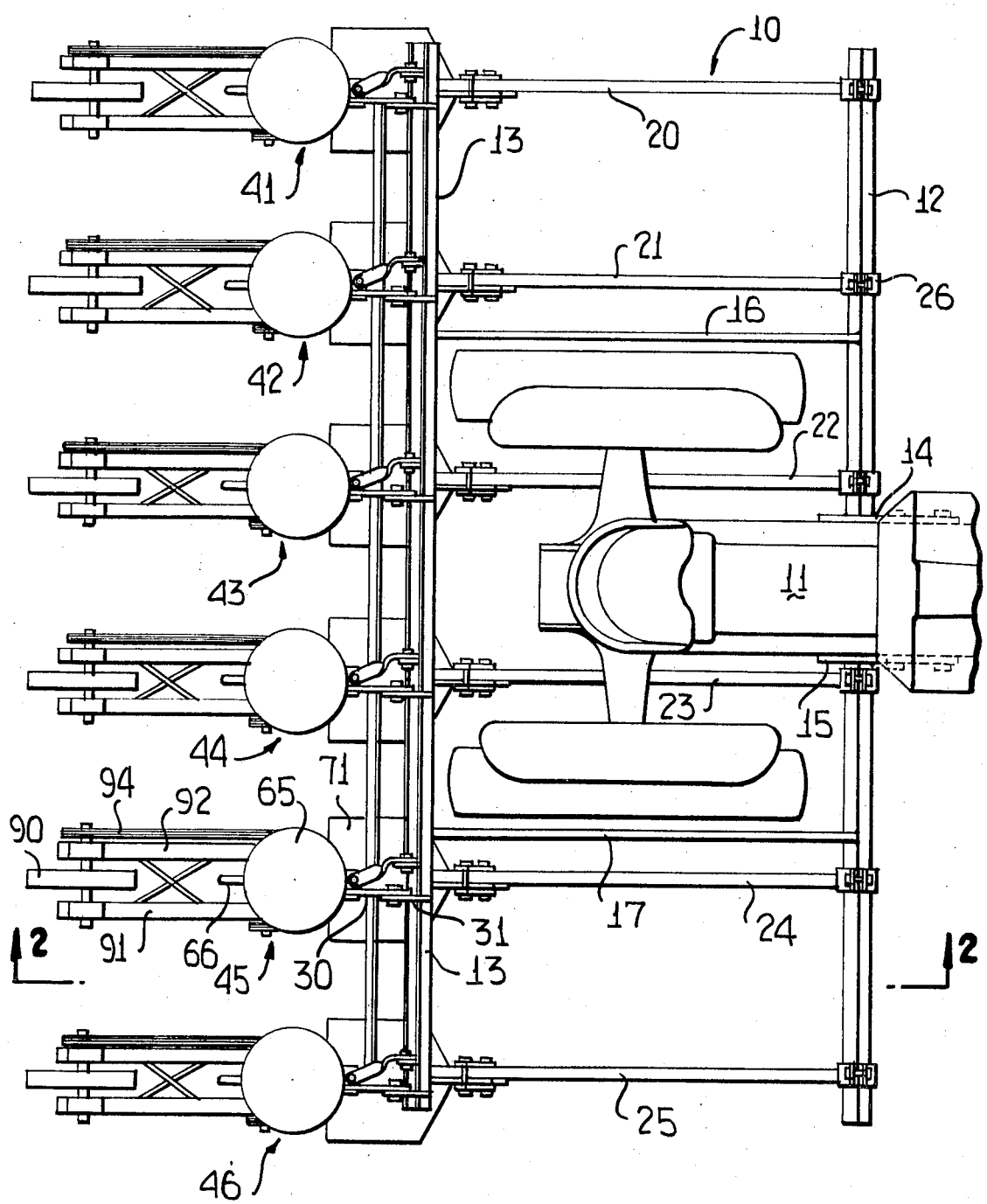

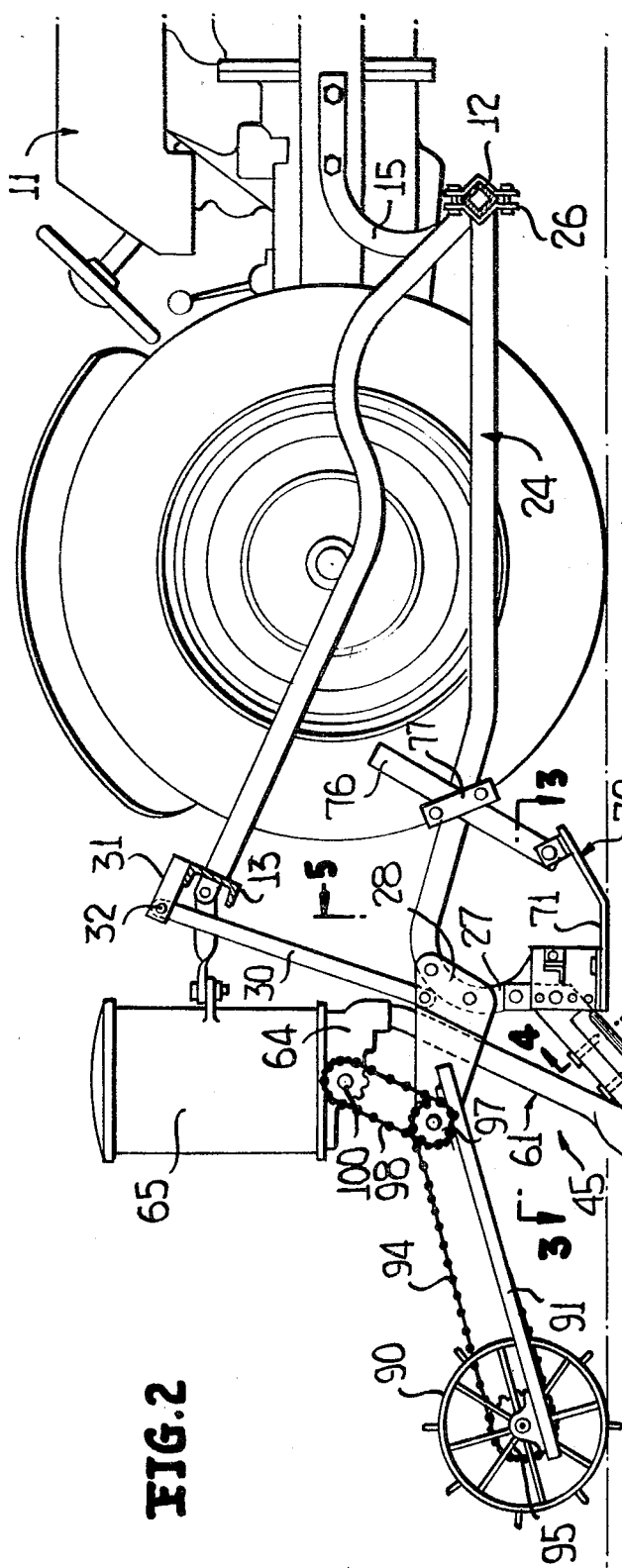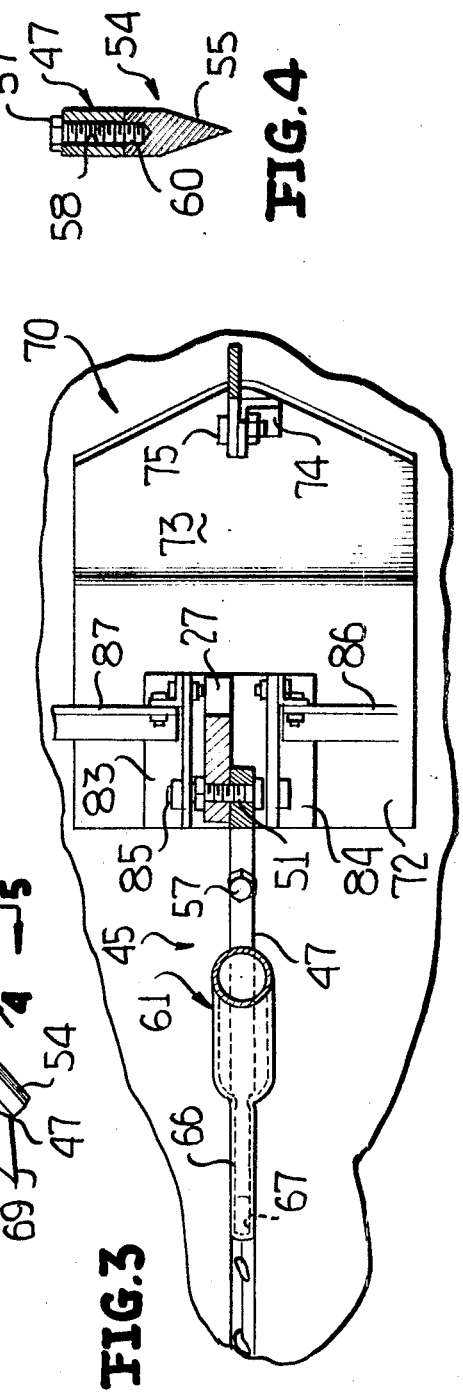

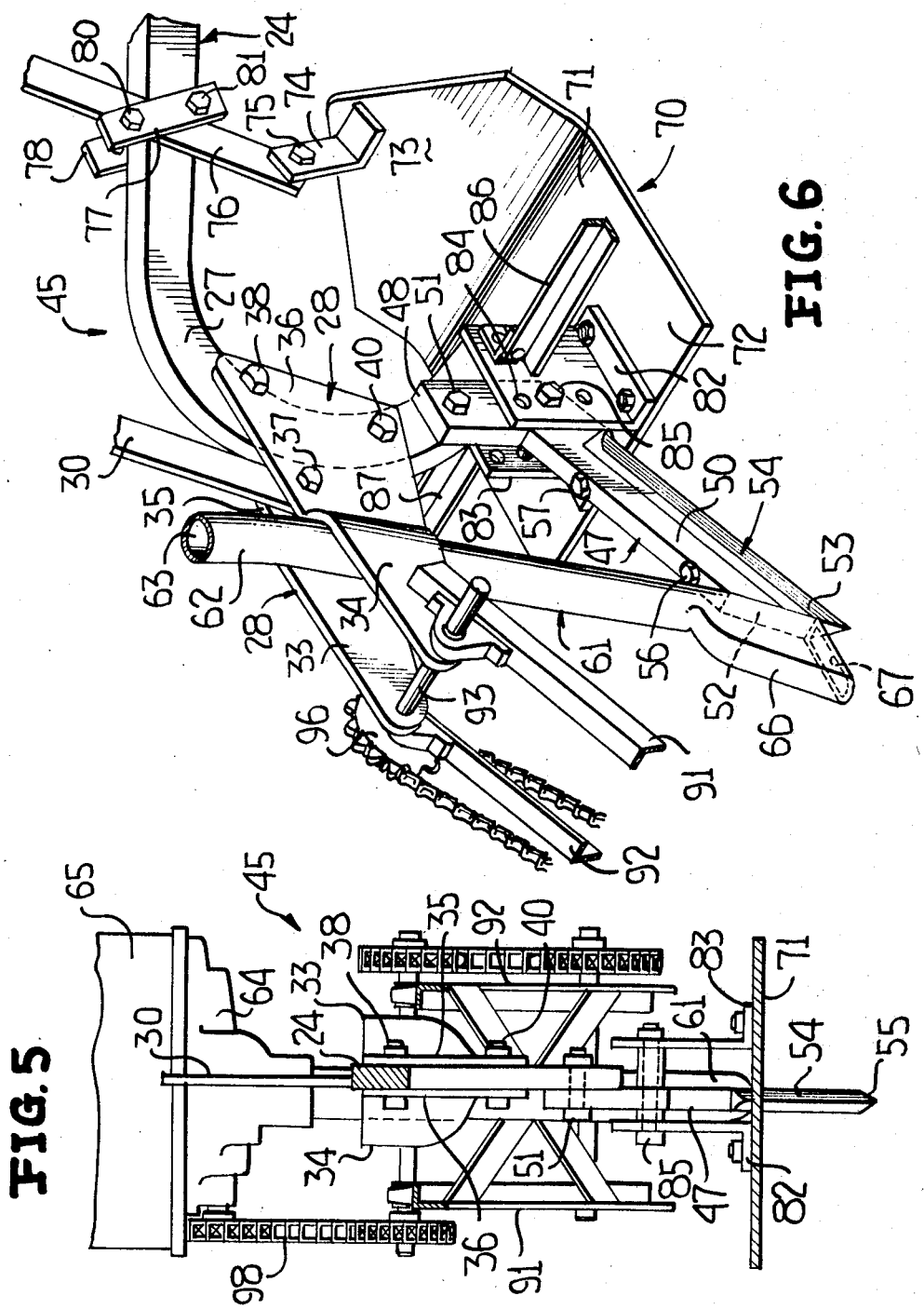

3,513,789
SEED PLANTING MECHANISM
Samuel J. Foose, Jr., Tchula, Miss. 39169
Filed Nov. 14, 1967, Ser. No. 682,875
Int. Cl. A01b *39/22;* A01c *7/18*
U.S. Cl. 111—86
3 Claims

ABSTRACT OF THE DISCLOSURE

This invention is directed to a seed planting mechanism which in its simplest form consists solely of a blade having a cutting edge for creating a furrow in the soil and a spout for directing seeds into the furrow from an associated hopper. The cutting edge of the blade is an independent element releasably secured to the blade whereby cutting edge elements of different widths can be secured to the blade for varying the width of the furrows dependent upon the size seeds being planted as well as to facilitate the sharpening and replacement of worn or dulled cutting edge elements. A discharge end portion of the spout is flattened to a thickness approximately the maximum thickness of the cutting edge and the discharge opening is disposed immediately rearwardly of a terminal end of the cutting edge to conjunctively prevent the closure of the discharge opening by vegetation, soil or other extraneous matter. Means are also provided for adjustably regulating the depth of penetration of the cutting edge into the soil.

---

Conventional mechanisms for opening furrows in the earth into which seeds are deposited are relatively well-known but for the most part such conventional planters are inefficient in operation because they defeat the intended functions thereof, namely, to rapidly deposit desired seeds in furrows of predetermined depth in a minimum time period without the displacement of excessive soil and the attended loss of moisture which prevents immediate seed germination, and quite obviously to additionally preclude extraneous matter from entering the furrows prior to the closing thereof. These deficiencies occur, for the most part, because of a lack of recognition by others of such factors as the different types of terrain, subsoil and above soil conditions, the type and size of seeds to be planted, etc. A conventional planting mechanism found adequate for planting, for example, small seeds, such as cotton and maize, might be found inadequate for planting larger size seeds, such as corn seeds, because of the tendency of the larger seeds to clog up or jam the discharge opening of an associated planter spout. Simply enlarging the discharge opening to accommodate larger seeds results in an indiscriminate discharge of smaller seeds to such an extent that the smaller seeds are primarily directed around but not in the furrow. This disadvantage of conventional seed planting mechanisms is further augmented by the tendency thereof to accumulate grass or similar material which clogs the discharge opening and/or is undesirably deposited in the furrow.

Planters of known construction also operate in a manner which completely disregards the loss of soil moisture resulting from the formation of furrows which are too wide, deep or both and which in general are simply for the most part too wide for the type seed being planted. When it is desired to plant small sized seeds at a shallow depth the use of conventional planting mechanisms which cut a wide swath-like furrow unnecessarily disturbs the soil and the moisture thereof is rapidly lost to the atmosphere thereby resulting in extremely slow seed germination or no germination until the next rainfall. In many areas this factor alone is the difference between a successful crop or crop failure.

It is therefore a primary object of this invention to provide a novel seed planting mechanism which eliminates the above and other disadvantages of conventional mechanisms while being simple yet efficient in operation irrespective of the type soil or terrain involved, the type seed being planted and/or the speed of planting.

A further object of this invention is to provide a novel seed planting mechanism of the type described which includes a blade carrying a removable cutting element, a seed spout having a discharge end portion secured to a trailing end portion of the blade, and the discharge end portion of the spout and trailing end portion of the blade being of substantially identical widths whereby each seed descending through the spout deposited in a furrow formed by a cutting edge of the cutting element and a discharge opening of the spout cannot be accidentally closed by extraneous material irrespective of the depth of penetration of the cutting edge into the soil.

A further object of this invention is to provide a novel speed planting mechanism of the type immediately heretofore defined wherein means are provided for rapidly removing and replacing the cutting element whereby cutting elements of different widths can be secured to the blade for varying the width of furrows dependent upon the size seeds being planted, and to facilitate the sharpening and replacement of worn or dulled cutting elements.

Still another object of this invention is to provide a novel seed planting mechanism as set forth heretofore including a sled-shaped member adapted to ride along the ground generally forwardly of the cutting element to cut a furrow of a uniform depth, and means associated with the sled-like member for adjusting the position thereof relative to the cutting element to vary the depth of furrows depending upon the type seeds being planted.

Still another object of this invention is to provide a novel seed planting mechanism of the type described wherein the cutting element is disposed at an angle of generally 45 degrees to the horizontal, and the widths of the discharge opening and the cutting edge at its widest point range between a minimum of ⅛″ and a maximum of ⅝″, and the discharge opening is preferably of a tear-shaped configuration with the narrower portion directed toward the direction of planter movement to assure the accurate discharge of any size seed into the furrow.

With the above and other objects in view that will hereinafter appear, the nature of the invention will be more clearly understood by reference to the following detailed description, the appended claimed subject matter, and the several views illustrated in the accompanying drawings.

In the drawings:

FIG. 1 is a fragmentary top plan view of a plurality of seed planting mechanisms, and illustrates the manner in which the mechanisms are secured in trailing relationship to a tractor.

FIG. 2 is an enlarged sectional view taken generally along line 2—2 of FIG. 1, and more clearly illustrates one of the seed planting mechanisms and particularly its blade, spout and depth-regulating sled member.

FIG. 3 is an enlarged fragmentary sectional view taken generally along line 3—3 of FIG. 2, and illustrates the similarity in width between a discharge end portion of the spout, the blade, and the furrow formed by a cutting element of the blade.

FIG. 4 is an enlarged sectional view taken generally along line 4—4 of FIG. 2 and illustrates the manner in which the cutting element is detachably secured to the planter blade.

FIG. 5 is an enlarged fragmentary sectional view taken generally along line 5—5 of FIG. 2, and more clearly illustrates the manner in which the planting mechanism is connected to the tractor and its relationship to an associated seek hopper.

FIG. 6 is a fragmentary perspective view of the seed planting mechanism, and completely illustrates the various components of the mechanism and their relationship one to another.

In accordance with this invention a plurality of seed planting mechanisms are connected to a common frame 10 (FIG. 1) which is in turn connected to a tractor 11 or a similar vehicle. The frame 10 includes a forward transverse beam 12 (FIGS. 1 and 2) and a rearward transverse beam 13. The beam 12 is welded or otherwise conventionally secured to a pair of plates 14, 15 which are in turn secured by bolts (unnumbered) to opposite sides of the vehicle 11, in the manner clearly illustrated in FIG. 2 of the drawings. A pair of beams 16, 17 are welded to the beams 12, 13 and a plurality of beams 20 through 25 are connected at forward ends thereof to the beam 12 by identical conventional clamps 26. Opposite ends 27 of the beams 20 through 25 are each connected to the beam 13 by a bracket 28, a rod or bar 30, and a plate 31. The plate 31 is preferably welded to the beam 13 and secured by a nut and bolt 32 to the bar 30. The bracket 28 includes a pair of rearwardly directed legs 33, 34 and forwardly directed legs 35, 36 the latter of which are connected by bolts 37, 38 and 40 to the bar 30 and the end portion 27. The frame 10 when so constructed is relatively rigid and sufficiently strong to support a plurality of seed planting mechanisms 41 through 46 (FIG. 1). Since the seed planting mechanisms 41 through 46 are identical the following description of the seed planting mechanism 45 is equally applicable to the remaining mechanisms and will be sufficient for a complete understanding of the invention.

The seed planting mechanism 45 is fully illustrated in FIGS. 2 through 6 of the drawings and includes a blade 47 having a first or leading end portions 48 and a second or trailing end portion 50. The end portion 48 is secured by one or more nuts and bolts 51 to the end portion 27 of the beam 24 while the trailing end portion 50 of the blade 47 includes a downwardly and rearwardly sloping upper surface portion 52 (FIG. 6) and a terminal end 53. The portion 50 of the blade 47 as well as a separate cutting element 54 carried thereby is disposed at an angle of approximately 45 degrees to the horizontal in the operative position of the mechanism (FIG. 2) as well as to the end portion 48.

The cutting element 54 (FIG. 4) includes a tapering cutting edge 55 (FIG. 4), and is preferably constructed from high carbon steel or similar wear-resistant metallic material. The cutting element 54 is removably secured to the end portion 50 of the blade 47 by a pair of bolts 56, 57 each passing through a smooth surface bore 58 of the blade 47 and being threadably engaged in threaded bores 60 of the element 54, in the manner clearly illustrated in FIG. 4 of the drawings. By unscrewing the bolts 56, 57 the cutting element 54 can be rapidly removed from the blade 47 and the cutting edge 55 thereof sharpened as found necessary. It should also be noted that the maximum width of the cutting element 54 coincides to the width of the blade 47, and in practice a maximum width of ¾" has been found sufficient to form a correspondingly sized furrow. However, if lesser or greater width furrows are found necessary the cutting element 54 can be removed in the manner heretofore described and replaced by a similar cutting element which may be narrower or wider at its wider portion than the cutting element 54 to vary the width of furrows formed thereby depending upon the size seed being planted. For example a ⅝" cuting element 54 has been found sufficient for planting corn seed but narrower cutting elements may be employed in lieu thereof for planting cotton, maize and/or soybean seeds.

A tubular seed spout 61 is disposed generally rearwardly of the blade 47 and includes a first end portion 62 having a seed entrance opening 63 (FIG. 6) into which seeds are delivered by a conventional mechanism 64 from a seed hopper 65. The upper end portion 62 of the spout 61 is embraced between but unsecured to the arms 33, 34 of the brackets 28 while a second end portion 66 of the spout 61 is flattened to a width corresponding to the width of the blade 47 and the maximum width of the cutting element 54. The end portion 66 is further flared outwardly at an angle to fully rest upon the upper surface portion 52 of the blade 47. Lines of welding (not shown) join the end portion 66 of the spout 61 to the blade 47 along the terminal side edges of the surface portion 52. The wall of the flattened end portion 66 in contact with the surface 52 may, is desired, be removed and the end portion 66 positioned with its wider parallel side walls (unnumbered) in straddling relatioinship to the blade 47. The straddling side walls when welded to the blade 47 offer additional reinforcement without in any way adversely affecting the operation of the mechanism.

The end portion 66 of the spout 61 may be provided with various shaped and sized discharge openings 67, depending upon the size seeds being planted. In a working embodiment of the invention the end portion 66 was formed by simply flattening a 2" diameter rod resulting in the formation of a generally rectangular discharge opening of a width (⅝") fully as wide as the maximum width of the blade 47. However, the end portion 66 may also be flattened to a tear-drop configuration forming a tear-drop discharge opening (not shown) with the narrow end portion of the opening disposed adjacent the end 53 of the blade 47. The purpose of this configuration is to discharge seeds of what ever size in as close proximity to the end 53 of the blade 47 to prevent seeds actually not even entering a furrow, as is the case in many conventional planting mechanisms. The apex of the discharge opening also tends to direct each seed directly into the furrow by the guidance offered each seed by the rearwardly diverging opposed edges of the opening. It is to be particularly noted that irrespective of the particular configuration of the discharge opening 67 the width of the end portion 66, the blade 47 and the cutting element 54 are generally identical (FIGS. 3 and 5) which assures the formation of like sized furrows and which also prevents straw, grass or similar debris from entering the opening 67 because the latter is narrower than the width of the blade and the cutting element and is, in effect, shielded thereby. Furthermore, due to the identical widths of the elements and the absence of side overhand or similar protrusions material which might tend to adhere to the cutting element 54 or the blade 47 is in practice immediately sloughed-off to either side of the blade 47 and does not enter the furrow. The upwardly and rearwardly sloping edge 69 also assures the discharge of each seed into the furrow.

Means generally designated by the reference numeral 70 are provided for regulating the depth of each furrow cut by the element 54 of each of the planting mechanisms 41 through 46. The means 70 includes a sled-like member 71 having a normally horizontally disposed trailing end portion 72 and a forwardly and upwardly inclined leading end portion 73 to which is attached a L-shaped bracket 74. The bracket 74 is in turn connected to the rear end portion 27 of the beam 24 by a bolt 75, a rod 76 and a pair of plates 77, 78 joined to each other by nuts and bolts 80, 81. The rod 76 is therefore slidably received between the beam 24 and the plate 77 which permits the leading end portion 73 of the member 71 to be adjusted at a predetermined desired height by moving the rod 76 relative to the beam 24 tightening the nuts and bolts 80, 81.

The trailing end portion 72 of the sled-like member 71 is provided with a pair of L-shaped brackets 82, 83 provided with a plurality of transversely aligned and vertically spaced apertures 84 through which pass a bolt 85 and an associated nut (unnumbered). The bolt 85 additionally passes through an aperture (unnumbered) in the blade 47, as is shown in FIG. 5 of the drawings. By positioning the bolt 85 in any one of the apertures 84 of the plates 82, 83 and the aligned aperture of the blade 47 the height of the trailing end 72 can be varied to regulate the depth of penetration of the cutting element 54, in the manner readily apparent from FIG. 2 of the drawings.

In order to rigidify adjoining ones of the depth adjusting means 70 each sled-like member 71 is secured to an adjacent sled-like member by means of angle irons 86, 87 secured between the brackets 83, 84 of the adjacent sled members.

The seed feed mechanism 64 (FIGS. 2 and 5) is of a conventional construction and is driven by a paddle-like wheel 90 journalled for rotation between a pair of angle bars 91, 92 which are in turn supported by a shaft 93 journalled for rotation in the arms 33, 34 of the bracket 28. A chain 94 is entrained about a pair of sprockets 95, 96 whereupon rotation of the paddle-like wheel 90 rotates the shaft 93 which in turn rotates a sprocket 97 (FIG. 2) fixed thereto. The sprocket 97 is in turn employed to rotate the drive shaft of the mechanism 64 by means of a chain 98 and a sprocket 100. Thus, upon the rotation of the wheel 90 during the forward motion of the tractor 11 seeds are individually fed by the mechanism 64 to the spout 61 and thence into the furrow formed by the cutting element 54. It is to be noted that the paddle-like wheel 90 is in direct rearward alignment with the spout 61 and the blade 47 and functions to cover the furrow after the seeds have been deposited therein.

While preferred forms and arrangement of parts have been shown in illustrating the invention, it is to be clearly understood that various changes in details and arrangement of parts may be made without departing from the spirit and scope of the invention as defined in the appended claimed subject matter.

I claim:

1. A mechanism for planting seeds comprising a blade holder having first and second end portions, means for securing said first end portion to a vehicle, said second end portion extending rearwardly with respect to the direction of vehicle travel, a tubular spout disposed generally rearwardly of said second end portion, said spout having first and second end portions, said spout first end portion having an entrance opening adapted to receive seeds from a hopper, said spout second end portion having a seed discharge opening, means rigidly connecting said spout to said blade holder with the blade holder and spout second end portions in contiguous relationship, a separate element having a cutting edge carried by said blade holder, the width of said spout second end portion being substantially equal to the maximum width of said cutting edge whereby each seed descending through said spout is deposited in a furrow formed by said cutting edge, said discharge opening being disposed immediately rearwardly and upwardly above a trailing terminal end of of said blade holder second end portion whereby in conjunction with the similarity of said widths said discharge opening cannot be accidentally closed by extraneous material irrespective of the depth of penetration of said cutting edge into the soil, said cutting edge element and said blade holder having abutting surfaces, means for detachably securing said cutting edge element to said blade holder with said abutting surfaces in contact whereby cutting edge elements of different widths can be secured to said blade holder for varying the width of furrows dependent upon the size seeds being planted and to facilitate the sharpening and replacement of worn or dulled cutting edge elements, means for adjustably regulating the depth of penetration of said cutting edge into the soil, said depth regulating means being a sled-shaped member having leading and trailing end portions, said trailing end portion being disposed adjacent and forwardly of said cutting edge and generally parallel to the horizontal, said leading end portion being disposed remote from said cutting edge and inclined at an angle to the horizontal, said depth regulating means includes vertically spaced aperture means in a portion of said sled-shaped member alignable with aperture means in said blade holder first end portion, means selectively positionable into said apertures for selectively positioning said trailing end portion in different horizontal planes intersecting said cutting edge, and means for adjustably connecting the leading end portion of said sled-shaped member to an associated vehicle.

2. The mechanism as defined in claim 1 wherein said abutting surfaces are uniplanar and flat, and the abutting surface of said cutting edge element is of an area corresponding to the area of the abutting surface of said blade holder.

3. The mechanism as defined in claim 1 wherein said vertically spaced aperture means are a plurality of apertures formed in a plate carried by said sled-shaped member.

References Cited

UNITED STATES PATENTS

| 613,115 | 10/1898 | Brennan et al. | 111—86 |
| 3,076,511 | 2/1963 | Johnson | 172—387 |
| 3,261,310 | 7/1966 | Cronk et al. | 111—86 X |

ROBERT E. PULFREY, Primary Examiner

R. C. HARRINGTON, Assistant Examiner

U.S. Cl. X.R.

172—729